United States Patent
Henson et al.

(10) Patent No.: US 6,826,457 B2
(45) Date of Patent: Nov. 30, 2004

(54) APPARATUS FOR ELECTRICALLY CONTROLLING DEVICE, AND A METHOD OF OPERATING IT

(75) Inventors: Jim Henson, Round Rock, TX (US); Richard J. Davis, Burlison, TX (US); Michael Edmond Wilson, Austin, TX (US); Diana Rodriguez, Alvarado, TX (US)

(73) Assignee: Carling Technologies, Inc., Plainville, CT (US)

( * ) Notice: Subject to any disclaimer, the term of this patent is extended or adjusted under 35 U.S.C. 154(b) by 0 days.

(21) Appl. No.: 10/203,341

(22) PCT Filed: Feb. 7, 2001

(86) PCT No.: PCT/US01/03941

§ 371 (c)(1),
(2), (4) Date: Jul. 28, 2003

(87) PCT Pub. No.: WO01/59559

PCT Pub. Date: Aug. 16, 2001

(65) Prior Publication Data

US 2004/0030459 A1 Feb. 12, 2004

(Under 37 CFR 1.47)

Related U.S. Application Data

(60) Provisional application No. 60/181,355, filed on Feb. 8, 2000.

(30) Foreign Application Priority Data

Dec. 18, 2000 (JP) .......................................... 2000-384003

(51) Int. Cl.[7] .................................................. G06F 7/00
(52) U.S. Cl. .................................. 701/1; 701/22; 701/35
(58) Field of Search ................................. 701/22, 1, 33, 701/35, 36; 706/13, 61

(56) References Cited

U.S. PATENT DOCUMENTS

| 4,574,355 A | 3/1986 | Beatty et al. ................ 364/492 |
| 4,942,571 A | 7/1990 | Moller et al. ............... 370/85.1 |
| 5,666,256 A | 9/1997 | Zavis et al. .................. 361/115 |

*Primary Examiner*—Gertrude A. Jeanglaude
(74) *Attorney, Agent, or Firm*—McCormick, Paulding & Huber LLP (57) ABSTRACT

A control system for electrical devices in a vehicle has solid state output/relay (12) modules with processing and memory capability. The output/relay module (12) is programmable to store configuration data corresponding to predetermined states for the various devices to be controlled. The output/relay (12) module has memory capability including a non-volatile component (EEROM, 47). A solid state input module also has processing capability, and includes memory capability. The input module has selector switches for pre-selecting a variety of device states. The input module further provides a visual indication of the states for these devices. A data bus (203) provides communication between said input and output modules, and a dongle (201) is selectively connected to said relay module data bus (203) for allowing changes to the configuration data (217) stored therein. The dongale (201) is programmable from a personal computer or work station.

20 Claims, 3 Drawing Sheets

APPARATUS FOR ELECTRICALLY CONTROLLING DEVICE, AND A METHOD OF OPERATING IT

CROSS REFERENCE TO RELATED APPLICATION

This application claims priority to a provisional application filed Feb. 8, 2000 under Ser. No. 60/181,355, now abandoned, and a PCT application which was filed on Feb. 7, 2001 under International Application No. PCT/US01/03941 at the U.S. Patent and Trademark Office. The provisional and PCT applications mentioned above are incorporated by reference herein.

SUMMARY OF THE INVENTION

The present invention is directed to a control system for controlling the operation of electrical devices in a vehicle. The control system includes a power supply, a relay module having a microprocessor, computer memory and at least one output for controlling an electrical device in a vehicle. The relay module is programmable to store configuration data corresponding to predetermined states for the electrical devices to be controlled. The control system includes an input module having a microprocessor and a plurality of variable function switches for selecting predetermined states for the electrical devices. A databus is coupled between the input module and the relay module for transferring communications therebetween. A jumper is provided for configuring the relay module.

DETAILED DESCRIPTION

Figure 1:
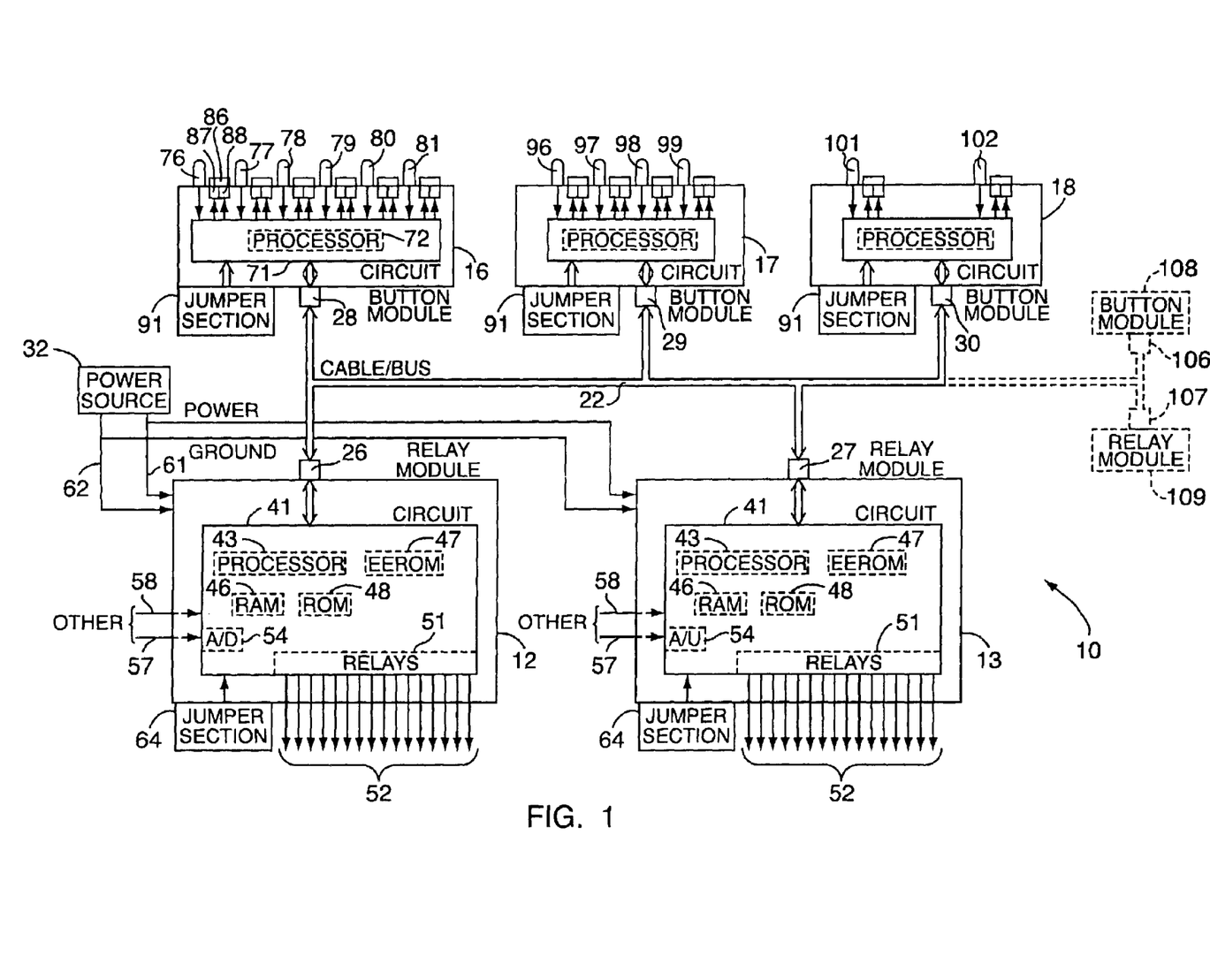
FIG. 1 is a block diagram of one embodiment of the system of the present invention.

FIG. 1 is a block diagram of a system 10 which can electrically control a variety of electrical devices. The system 10 may, for example, be used in a vehicle such as a car or boat to effect control of electrical devices such as lights, motors, pumps, and the like. The system 10 includes two relay modules 26 and 27, three button modules 16–18, and a four-conductor bus 22 in the form of a cable coupled to each of the modules 12–13 and 16–18 by a respective connector 26–30. The system 10 also includes a power source 32, which may be a battery present in a vehicle, or may be some other type of power source.

The modules 12–13 and 16–18 would typically be provided at different locations. For example, if the system 10 happened to be installed in a boat, the relay module 12 might be located near the wiring panel for the lighting in the boat, the relay module 13 might be located near the wiring panel for the motors and pumps, the button module 16 might be located on the main bridge, the button module 17 might be located on the flying bridge, and the button module 18 might be located in the main cabin.

In the system 10 of FIG. 1, the relay modules 12 and 13 are structurally identical, and differ only in that the module 12 serves as a master and the module 13 serves as a slave, in a manner discussed later. All of the button modules 16–18 also effectively serve as slaves to the master relay module 12. Since the relay modules 12 and 13 are structurally identical, only the module 12 is described here in detail.

More specifically, the relay module 12 includes a circuit 41, which is coupled to the connector 26. The circuit 41 includes a microprocessor shown diagrammatically at 43, a random access memory (RAM) shown diagrammatically at 46, an electrically erasable read-only memory (EEROM) shown diagrammatically at 47, and a read only memory (ROM) shown diagrammatically at 48. In the disclosed embodiment, the processor 43, RAM 46 and ROM 48 are all portions of a standard microcontroller integrated circuit, but it would alternatively be possible to implement the circuit 41 using a processor, RAM and ROM which are in different integrated circuit chips.

The ROM 48 contains a program which is executed by the processor 43. The EEROM 47 contains configuration data which will be discussed in more detail later. The module 12 has the capability to update the configuration information in the EEROM 47, in a manner described in more detail later. Aside from this upgrade procedure, the information in the EEROM 47 does not change during normal operation, or when power is turned off. In other words, the EEROM 47 is a non-volatile memory. The processor 43 uses the RAM 46 for temporary storage of information which changes dynamically during system operation. However, any data present in the RAM 46 will be lost when the power is turned off. Consequently, the system 10 restarts from a default configuration each time power is turned on.

The circuit 41 also includes a relay section 51, which includes sixteen relays that are not separately illustrated. The sixteen relays each have an output, and these sixteen outputs serve as control outputs from the circuit 41 and the module 12, as indicated at 52. These outputs can be coupled to various electrical devices to be controlled, such as lights, motors, pumps and the like.

The circuit 41 also includes an analog-to-digital (A/D) converter section 54, and the relay module 12 has an analog input 57 which is coupled to the A/D converter section 54. An analog signal applied to the input 57 is converted into a digital signal by the A/D converter section 54, and is then supplied to an input of the processor 43. The module 12 also has a digital input 58, which is coupled to an input of the processor 43. Although FIG. 1 depicts one analog input 57 and one digital input 58, the module 12 may have additional analog inputs and/or additional digital inputs. The relay module 12 receives power in the form of a direct current (DC) voltage on two lines 61–62 from respective output terminals of the power source 32.

The relay module 12 has a jumper section 64, which is coupled to the circuit 41. The jumper section 64 may be configured to have no jumpers, one jumper, or two or more jumpers. In the disclosed embodiment, the jumper section 64 of the module 12 has no jumpers, which is an indication to the processor 43 in the module 12 that the module 12 is the master relay module. As mentioned above, the relay module 13 is structurally identical to the module 12, but is a slave module. In the disclosed embodiment, the jumper section 64 of the module 13 has at least one jumper, which is an indication to the processor 43 in module 13 that the module 13 is a slave relay module. Although the disclosed embodiment uses a jumper section 64, it will be recognized that it could optionally be replaced with some other type of manual configuration arrangement, such as a thumbwheel, or a dual inline package (DIP) switch unit.

In the disclosed embodiment, the bus 22 includes four conductors, which respectively carry power and ground signals, digital serial data, and a serial clock signal. The serial clock signal synchronizes the transmission of the serial data. In the disclosed embodiment, serial data is transmitted using a technique similar to that known in the industry as the Inter-Integrated Circuit (IIC) communication standard. However, some other type of known serial interfaces could alternatively be used, such as the standard which is commonly used for serial ports of personal computers and known in the industry as an RS232 serial interface. In some applications, it would be possible to use a parallel bus, rather than a serial bus. Depending on the particular type of serial or parallel interface, the bus 22 may have a larger or smaller number of conductors than that shown in FIG. 1.

With respect to power, the master relay module 12 operates entirely from the power received on lines 61–62 from the power source 32. In contrast, since relay module 13 is designated as a slave module, it uses power received on lines 61–62 from the power source 32 to operate its relays 51, but uses power received through the bus 22 to operate other circuitry such as the microprocessor 43. The button modules 16–18 receive all of their operational power through the power and ground connectors in the bus 22.

The button module 16 includes a circuit 71 which is operationally coupled to the connector 28, and which includes a microprocessor 72. The button module 16 has six manually operable momentary push buttons 76–81, each of which is coupled to a respective input of the circuit 71. Adjacent each of the push buttons 76–81 is a label, one of which is identified by reference numeral 86. Each label 86 in the disclosed embodiment carries not-illustrated indicia that identifies the function of the adjacent push button. However, other indicia could be provided, or a label could have no indicia. Each of the labels 86 is translucent, so that light will pass through it when it is illuminated from the rear.

In this regard, a respective two-color light emitting diode (LED) is provided behind each of the labels 86, and has a green portion G indicated at 87, and a red portion R indicated at 88. The green and red portions 87 and 88 of each LED are shown separately in FIG. 1, in order to facilitate a clear understanding of the present invention. However, it will be recognized that, in the disclosed embodiment, these portions are implemented with a single device which, at any given point in time, can have only one of three states. In particular, it can be emitting no light, emitting green light, or emitting red light. The circuit 71 controls each of the LEDs. In the discussion which follows, a statement that an LED is "off" is a reference to a logical state of the LED, and does not necessarily mean that the LED is not emitting any light.

In this regard, the system 10 treats the red portion 88 of each LED as the operational LED, and treats the green portion 87 as a backlight for the associated label 86, so that the label 86 will be visible even in the dark. With respect to the backlight capability provided by the green portions 87 of the LEDs, the system has two modes of operation. In one operational mode, where the backlight capability is disabled, each LED can alternate between two states, where it emits red light from the red portion 88 when the LED is turned on, and emits no light when the LED is turned off (because the green portion 87 and red portion 88 are both turned off). In the other operational mode, where the backlight capability is enabled, each LED can alternate between two states, where it emits red light from the red portion 88 when the LED is turned on, and emits green light from the green portion 87 when the LED is turned off. Stated differently, when a given LED is turned on, it always emits red light from the portion 88, but when the LED is turned off, it emits green light from the portion 88 if backlight capability is enabled, or emits no light if backlight capability is disabled. The backlight capability is enabled and disabled on a system-wide basis. Thus, at any given point in time, all of the LEDs which happen to be in an off state will be doing the same thing, in that they will all be emitting no light, or they will all be emitting green light.

The button module 16 includes a jumper section 91, which is similar to the jumper section 64 described above in association with the relay module 12. The jumper section 91 of the button module 16 is coupled to inputs of the circuit 71. In view of the foregoing discussion, it will be recognized that the jumper section 91 could optionally be replaced with some equivalent device, such as a thumbwheel or a DIP switch unit.

The other two button modules 17 and 18 are each generally similar to the button module 16, except that the button module 17 has only four push buttons 96–99 with four adjacent labels and LEDs, and the button module 18 has only two push buttons 101–102 with adjacent labels and LEDs. Although FIG. 1 shows one six-button module 16, one four-button module 17, and one two-button module 18, the button modules in the system could be any suitable combination of two-button, four-button and/or six-button modules. Further, although the illustrated button modules each have two, four or six buttons, it will be recognized that a button module could have some other convenient number of buttons. Similarly, although the relay modules 12–13 each have sixteen relays with respective outputs, any other convenient number of relays could be provided on a given relay module.

Although FIG. 1 shows three of the button modules 16–18, and two of the relay modules 12–13, the system 10 could alternatively have a larger or smaller number of button modules, and a larger or smaller number of relay modules. In this regard, the minimum configuration of the system would be one relay module, which is the relay module 12, and one of the button modules 16–18, depending on whether the number of buttons needed for the system was two, four, or six. With the provision of a modified cable with one or more extra connectors, for example as shown diagrammatically at 106 and 107, the illustrated system could be expanded to include at least one additional button module, for example as shown diagrammatically at 108, and/or at least one additional relay module, for example as shown diagrammatically at 109. On each of the button modules which are present in the system, the jumpers of the jumper section 91 will be set to a respective different configuration, so the button modules and the relay module 13 can be distinguished from each other when all such slave modules are viewed through the bus 22 by the master relay module 12.

As mentioned above, the EEROM 47 in the relay module 12 includes configuration information for the system 10. The configuration information in the EEROM 47 serves as configuration information for the entire system. Even though the slave relay module 13 has a comparable EEROM 47, which is capable of holding similar configuration information, this capability is not used when the relay module 13 is functioning as a slave module, rather than as a master. However, the processor 43 in the slave relay module 13 does execute the program stored in the associated ROM 48, which is responsive to the associated jumper section 64 to cause the module 13 to act as a slave rather than as a master.

In the master relay module 12, the configuration information in the EEROM 47 defines, for each push button

76–81, 96–99, and 101–102 in the system, the relay(s), if any, which will be associated with that push button. A given push button may be associated with no relay, one relay, or several relays. As one very simple example, the push button 76 may be associated with three relays, and the EEROM 47 in the module 12 will contain information which indicates that these three relays are associated with the push button 76. This portion of the configuration information may be referred to as mapping definition information, because it defines the mapping between the pushbuttons and the relays which are present in the system.

The configuration information in the EEROM 47 also defines, for each of the push buttons 76–81, 96–99 and 101–102 in the system, the manner in which the push button will operate, or in other words the function which it will implement. This portion of the configuration information may be referred to as function definition information. As two very simple examples, which are each discussed in more detail below, the configuration information may indicate that the push button 76 is to function as a momentary switch, such that the system will turn on each relay associated with the push button 76 while the push button 76 is pressed, and will turn off each of those relays while the push button 76 is released. Alternatively, the configuration information may indicate that the push button 76 is to function as a toggle switch, such that one push and release of the push button 76 will cause the system to turn on each relay associated with the push button 76, and the next push and release of push button 76 will cause the system to turn off each relay associated with the pushbutton 76.

Each of the push buttons in the system may be associated with any one of several different functions. The particular function to be implemented by any given push button is determined when the system is being initially configured, as discussed later. Thereafter, the selected function is always associated with that particular push button during normal system operation. The various functions which are available in the system 10 of FIG. 1 are discussed below. Not all of the functions need to be implemented in any given system. However, when the system is being configured, they are all available for selection to the extent that any one of these functions may be needed in a given system.

The available functions may be categorized as primary functions and secondary functions. Some of the available functions may be implemented only as a primary function, some may be implemented only as a secondary function, and some may be optionally implemented as either a primary function or a secondary function. In more detail, every push button has a primary function, which is executed immediately when the button is pressed, without waiting for the release of the button. In addition, some push buttons may optionally have a secondary function, which is carried out if the push button is pressed and held for at least three seconds before being released. It should be noted that, when a push button is operated to invoke the secondary function, the primary function is also necessarily invoked. In particular, the primary function will be invoked immediately when the push button is pressed. Thereafter, if the operator keeps the push button pressed for at least three seconds, the secondary function will also be invoked.

Turning in more detail to the specific functions which are available for each of the push buttons in the system 10, a first function is that a given push button can be configured to operate as a "momentary" switch. This is a primary function, and a push button which implements this function can be used to control from 1 to 64 relays. The upper limit of 64 is an arbitrary number selected for the embodiment disclosed in FIG. 1, and could alternatively be a higher or lower number. TABLE 1 is a truth table showing how such a push button would operate.

The first row of TABLE 1 represents the status before the push button is pressed, and indicates that the system 10 has each associated relay turned off, and has the LED which is adjacent that push button in an off state. As discussed above, when the associated LED is in its off state, it will be emitting no light if backlight capability is disabled, or will be emitting green light if backlight capability is enabled. The second row of TABLE 1 shows what happens when the push button is pressed, and while it is manually held. In particular, the system 10 turns on each associated relay, and turns on the adjacent LED. When the LED is on, it emits red light. The third row of TABLE 1 indicates what happens when the push button is manually released. In particular, the system 10 turns off each associated relay, and turns off the associated LED, so the LED again emits no light or green light, depending on whether or not backlight capability is enabled.

The next function which can be selected for a given push button is a "toggle" switch function. This is a primary function, and a button implementing this function can control from 1 to 64 relays. The upper limit of 64 is an arbitrary selection, and could be higher or lower. TABLE 2 is a truth table showing the operation of the toggle function. In this regard, the left column of the table indicates how many times the push button has been pressed. Thus, the first row shows the state before the push button is pressed, where the system has each corresponding relay turned off, and has the corresponding LED turned off so that it emits no light or green light. The second row of TABLE 2 indicates what happens when the push button is then pressed. In particular, the system turns on each corresponding relay, and also turns on the corresponding LED, so that it emits red light. As mentioned above, and since this is a primary function, the change in state occurs as soon as the push button is pressed, without waiting for it to be released. The third row of TABLE 2 shows what happens when the push button is pressed again, where the system turns off each associated relay, and turns off the associated LED so that it emits no light or green light. This second change in state is also implemented as soon as the button is pressed, without waiting for it to be released.

Another function which can be assigned to a push button is the "toggle with backlight" function. This is a primary function, and a button implementing this function can control from 0 to 64 relays. The upper limit of 64 has been arbitrarily selected, and could be higher or lower. TABLE 3 is a truth table showing how the system responds to operation of a push button which is assigned this particular function. It will be noted that TABLE 3 is similar to TABLE 2, except that it includes an additional column relating to the backlight capability. In particular, the first time that the push button is pressed, it toggles the state of the backlight capability. If backlight capability was disabled, pressing the push button causes backlight capability to be enabled. Conversely, if backlight capability was enabled, pressing the push button causes backlight capability to be disabled.

This foregoing explanation of the toggle with backlight function was based on the assumption that only one push button had the power to control the backlight capability. It is possible to configure the system 10 so that two or more push buttons can each control the backlight capability. In that case, the system 10 keeps an independent record of whether each such button is currently indicating that backlight capability should be on or should be off. If any one of these push buttons is currently indicating that backlight capability should be on, then the system keeps backlight capability enabled. However, if all of these push buttons are indicating that backlight capability should be off, then the system disables backlight capability.

A final comment regarding TABLE 3 relates to the column entitled "Relay State". It should be evident that this column relates to a situation where the push button in question is being used to control one or more relays. If the push button configured for this function is not assigned to any relay, then the "Relay State" column can effectively be ignored. The reason that such a push button might not control any relay is that it may be desirable to be able to enable and disable the backlight capability without changing the state of any relay.

A further function which can be assigned to a push button is the "exclusive scroll" function. This is a primary function, and in the disclosed embodiment can be implemented to control either two, three or four relays. The upper limit of four relays is arbitrary, and it will be recognized that it would be possible to implement this function with a larger number of relays. TABLE 4, TABLE 5 and TABLE 6 are respective truth tables, which depict the operation of this function for two relays, three relays and four relays, respectively.

In TABLE 4, the first row represents the state before the push button is pressed. In particular, the two relays assigned to the push button are both turned off by the system, and the associated LED is also turned off. The second row indicates that happens the first time the push button is pressed. In particular, the first relay "A" is turned on, and the associated LED is turned on, but the second relay "B" is kept off. The third row of TABLE 4 indicates what happens the second time the push button is pressed. In particular, the first relay is turned off, the second relay is turned on, and the LED is kept on. The third row of the table shows what happens the third time the push button is pressed. The first relay is maintained in the off state, the second relay is changed from the on state to the off state, and the LED is changed from the on state to the off state. TABLE 5 and TABLE 6 are similar to TABLE 4, and it is believed that they will be readily understood by analogy to TABLE 4, without a separate detailed discussion.

Still another function which can be assigned to a given button is the "inclusive scroll" function. This is a primary function, and can be implemented in association with two relays, three relays or four relays. The upper limit of four relays is arbitrary, and could optionally be higher. TABLE 7 is a truth table showing the operation of this function. The first time the push button is pressed, the first relay "A" is turned on, and the associated LED is turned on. The second time the push button is pressed, the first relay and the LED are both kept on, and the second relay "B" is turned from the off state to an on state. The third time the push button is pressed, both relays and the LED are turned off. TABLE 8 and TABLE 9 are truth tables showing the inclusive scroll function for three relays and four relays, respectively. It is believed that TABLES 8 and 9 will be readily understood by analogy to TABLE 7, and that a separate detailed discussion of TABLES 8 and 9 is not necessary.

Another function which can be assigned to a given push button is the "binary scroll" function. This is a primary function, and a button assigned this function can control either two relays, three relays or four relays. The upper limit of four relays is arbitrary, and could optionally be larger. FIG. 10 is a truth table showing the operation of the binary scroll function for two relays. The first row of TABLE 10 shows the state before the push button is pressed, where a first relay "A", a second relay "B", and an associated LED are all off. The second row represents the first press of the push button, which causes the first relay and the LED to be turned on, and the second relay to be maintained in an off state. The third row corresponds to the second press of the push button, which causes the first relay to be turned off, the second relay to be turned on, and the LED to be maintained in an on state. The fourth row corresponds to the third press of the push button, which causes the first relay to be turned back on, the second relay to be maintained in its on state, and the LED to be maintained in its on state. The fifth row corresponds to the fourth press of the push button, and causes the LED and both relays to be turned off.

Persons of ordinary skill in the art are familiar with the binary bit patterns which correspond to the numbers 0 to 3. In particular, the numbers 0, 1, 2 and 3 correspond to respective binary bit patterns of "00" "01", "10" and "11". It will be noted that the first four rows of the two relay columns in TABLE 10 implement this sequence, where relay "A" is the least significant bit and relay "B" is the most significant bit.

TABLE 11 and TABLE 12 depict the operation of the binary scroll function for three relays and four relays, respectively. It is believed that TABLEs 11 and 12 will each be readily understood by analogy to TABLE 10, and they are therefore not discussed here in detail.

A further function which can be assigned to a given push button is a "timer" function. This is always a secondary function. As discussed above, the primary function for a given push button is invoked as soon as the button is pressed. If the button also has a secondary function, the secondary function will be invoked if the button is held for at least three seconds before being released, and this is true even though the primary function has already been invoked by the same press of the push button. If there is a secondary function but the push button is released in less than three seconds, then the secondary function will not be invoked, and only the primary function will occur.

A push button which implements the timer function can be used to control from 1 to 64 relays. As discussed above, the upper limit of 64 is arbitrary, and could optionally be higher or lower. In the system 10 of FIG. 1, when a push button is assigned the timer function as its secondary function, it is normally assigned a primary function which is the toggle function discussed above in association with TABLE 2. This is arbitrary, and it will be recognized that the primary function could alternatively be some function other than the toggle function.

TABLE 13 is a truth table showing the operation of both the primary and secondary functions for a push button which is configured to have the timer function as its secondary function. The primary function is shown in the first three rows of the table, and it will be noted that they correspond directly to TABLE 2. The secondary function is shown in the last two rows. In particular, the next-to-last row represents the status when the secondary function has not yet been invoked, where the dash indicates that the secondary function does not exert any control with respect to the associated LED or any associated relay. The last row of the table indicates that the secondary function will be invoked when the push button is pressed and held for three seconds, and will cause the system to turn on each associated relay for a predetermined time interval of "X" seconds. During this time interval, the system also flashes the associated LED. At the end of this time interval, the system turns off each associated relay and the associated LED, and the secondary function terminates. The length of the time interval is set during system configuration. The configuration information in the EEROM 47 of module 12 includes a byte containing a value that defines the length selected for the time interval during system configuration. In the disclosed embodiment, the predetermined time interval can range from 3 seconds to 765 seconds, in 3-second increments. However, the range and increment are arbitrary, and could be different.

Still another function which can be assigned to a push button is the "intermittent" function. The intermittent function can optionally be either a primary function or a secondary function, as discussed below. A push button which implements the intermittent function can control from 1 to 64 relays. The upper limit of 64 is arbitrary, and could optionally be higher or lower. In general, when the intermittent function is enabled, there is a repeating cycle which has a length or total cycle time of "Y" seconds, and which has successive first and second portions, the first portion having a time interval of "Z" seconds, where Z is less than Y. The lengths of the time intervals Y and Z are set during system configuration, and are stored in the configuration information in the EEROM 47 of the module 12. However, the total cycle time Y can optionally be changed in a dynamic manner during system operation, in a manner described later. In the disclosed embodiment, the total cycle time Y can range from 3 seconds to 765 seconds in 3-second increments, but this range and increment amount are arbitrary, and could be different. The first portion Z of the total cycle time can be any value less than the time interval Y, in 3-second increments. This increment amount is also arbitrary, and could be different.

As mentioned above, when the intermittent function is enabled, the system 10 repeatedly executes the first and second portions of the cycle in an alternating manner, and this continues until the intermittent function is disabled. During the first portion of the cycle, each associated relay and the associated LED are turned on. During the second portion, each associated relay is turned off, and the associated LED is flashed. Each time the cycle begins, the system starts two timers, one of which is timing the time interval Y and the other which is timing the time interval Z. The first portion of the cycle is the time period until the timer for Z expires, at which point the second portion of the cycle begins. When the timer for Y expires, the cycle ends and a new cycle is started.

TABLE 14 is a truth table showing the operation of the intermittent function when it is configured to be a primary function. The first row of TABLE 14 represents the status before the push button is pressed, or in other words when the intermittent function is disabled. Each associated relay and the associated LED are off. The second row represents the status when the push button is pressed in order to enable the intermittent function. As discussed above, the system repeatedly executes the cycle that has the first portion of Z seconds and the second portion of Y–Z seconds. Each relay is turned on during the first portion and off during the second portion, and the associated LED is turned on during the first portion and is flashed during the second portion. The third row of the table indicates what happens when the push button is pressed again in order to disable the intermittent function. The system turns off each associated relay and the associated LED.

TABLE 15 is a truth table showing the operation of the intermittent function when it is configured to be a secondary function. The first three rows of TABLE 15 show the operation of the primary function of the button, which in this case is the toggle function described above in association with TABLE 2. However, the primary function for this button could optionally be some other function. The last three rows of TABLE 15 show the operation of the secondary function and correspond generally to TABLE 14, except that the push button must be held for 3 seconds in order to enable the intermittent function. The intermittent function is turned off the next time the push button is pressed, whether or not the push button is held for as long as 3 seconds. This corresponds to the last row of TABLE 15.

Still another function which can be assigned to a push button is an "intermittent period increment" function. This is a primary function, and a button assigned this function does not control any relays. TABLE 16 is a truth table depicting the operation of this function. When the push button is pressed, the system increments the value of Y, which represents the total cycle time used for the intermittent function discussed above in association with TABLE 15. In particular, each time the push button is pressed, the system increments Y by a predetermined increment amount which is selected at the time of configuration. The system turns on the associated LED, and keeps it on so long as the button is pressed. When the button is released, as indicated by the last row of TABLE 16, the only action taken is to turn off the associate LED.

A further function is the "intermittent period decrement" function, which is generally similar to the intermittent period increment function discussed above in association with TABLE 16. A truth table for the intermittent period decrement function is shown in TABLE 17. TABLE 17 should be readily understood by analogy to TABLE 16, and TABLE 17 is therefore not described separately in detail.

The button functions described above are exemplary, and it will be recognized that it would be possible to implement variations of these functions, or some other functions. As one example, it will be recognized that the time value of X discussed above in association with TABLE 13, or the time value of Z discussed above in association with TABLES 14 and 15, could be incremented or decremented by additional functions similar to the increment and decrement functions discussed above in association with TABLES 16 and 17.

A further feature of the system is the capability to be configured to implement "clone" buttons. A selected push button can have up to four clone push buttons, although the upper limit of four is arbitrary and could be different. A clone is a push button and associated LED which have exactly the same function and control exactly the same relays as the selected push button. Actuation of any one of the clone push buttons is treated as if the selected pushbutton itself had been actuated. The LEDs adjacent the clone buttons are each controlled in exactly the same manner as the LED adjacent the selected push button. Typically, the selected push button and the clone push buttons are disposed in different physical locations. On a boat, for example, a push button for controlling the running lights might be on the main bridge, and might have clones on the flying bridge and in the main cabin.

Figure 2:
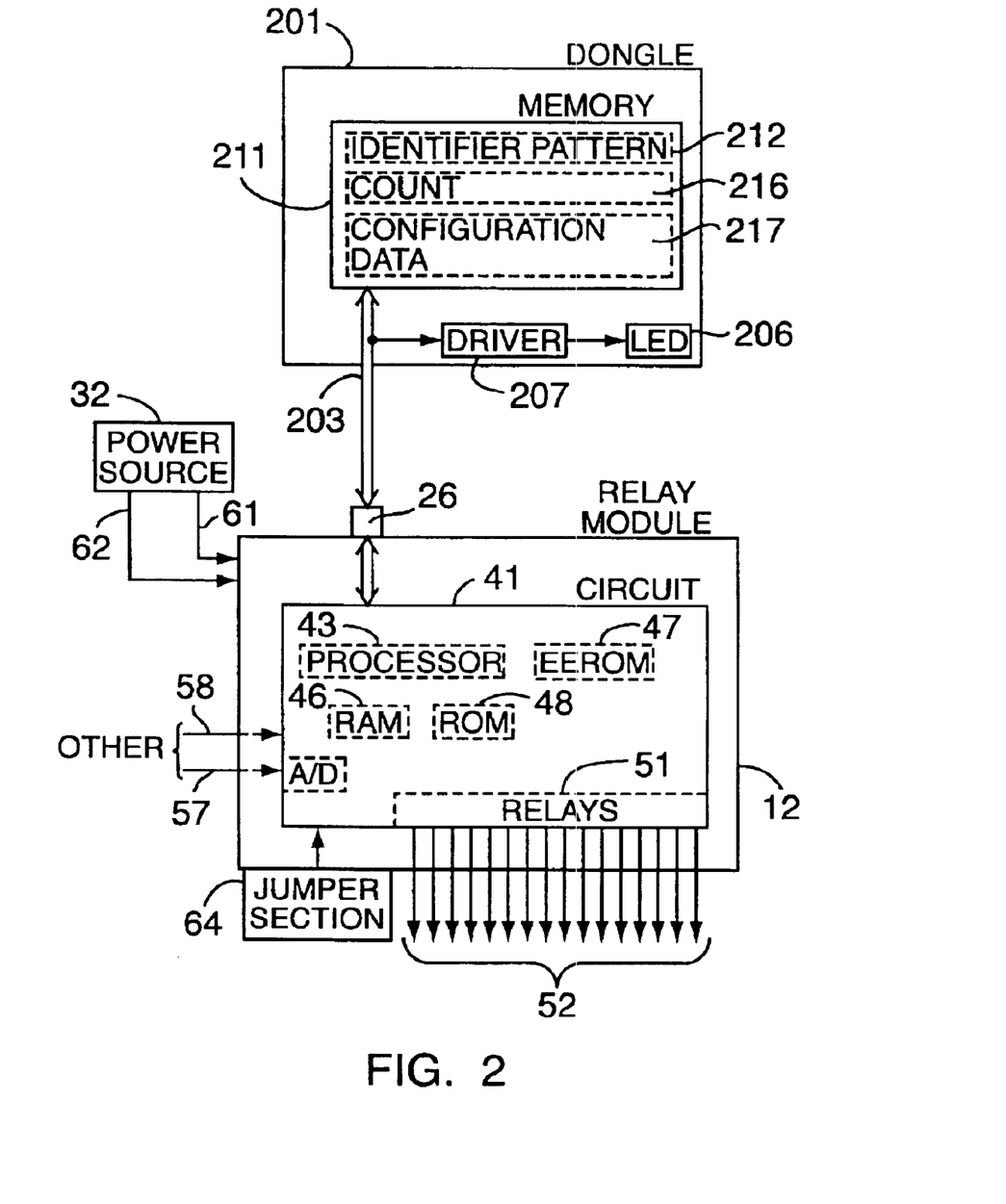
FIG. 2 is a block diagram of the relay module of FIG. 1 coupled to a dongle in accordance with the present invention.

As mentioned above, the internal operational configuration of the system 10 of FIG. 1 is determined by the configuration information stored in the EEROM 47. The manner in which this configuration information is introduced into the EEROM 47, and the manner in which it can be updated, will now be described with reference to FIG. 2. FIG. 2 shows the relay module 12 of FIG. 1, but with the cable for bus 22 disconnected from the connector 26, to thereby uncouple the master relay module 12 from all of the other relay and button modules 13 and 16–18. FIG. 2 shows a dongle 201, which has a bus 203 disposed in a cable that is coupled to the connector 26 of the relay module 12.

Bus 203 is a four-conductor bus equivalent to that discussed above in association with bus 22 of FIG. 1. In particular, the bus 203 includes power and ground conductors that carry a voltage differential, and the dongle 201 receives all its operating power from these two conductors of the bus 203. The bus 203 also includes a serial data conductor and a serial clock conductor, which are equivalent to those discussed above in association with the bus 22.

The dongle 201 further includes an LED 206 which is externally visible, and a driver circuit 207 for the LED 206. The driver circuit 207 has an input coupled to the serial clock conductor of the bus. When there is no activity on the bus 203, the serial clock conductor will stay at a single logic state, which causes the driver circuit 207 to keep the LED 206 turned off. When there is activity on the bus 203, the serial clock conductor will carry an active digital clock signal, which alternates between two logic states, in response to which the drive circuit 207 will cause the LED 206 to turn on and off as the clock signal changes states. This will cause the LED 206 to flash at a high rate of speed, with a duty cycle in which it is on a greater percentage of the time than it is off. Consequently, to a human eye, the LED 206 will appear to be on whenever there is activity on the bus 203.

The dongle 201 also includes a memory 211, which is coupled to the bus 203. In the disclosed embodiment, the memory 211 is a commercially available part, which includes the circuitry needed to store information, and also includes the circuitry needed to interface with an IIC-compatible bus, such as the bus 203. The memory 211 is an electrically erasable read-only memory.

The information stored in the memory 211 includes an identifier pattern 212, which serves two purposes. First, it serves a validity and/or security purpose. The processor 43 in the relay module 12 can check the identifier pattern 212, in order to determine whether the memory 211 in the dongle 201 currently contains valid information, as opposed to invalid information such as random bit patterns of the type commonly known in the industry as "garbage". Second, the identifier pattern 212 is used to indicate to the processor 43 what the processor 43 should proceed to do. In particular, depending on the identifier pattern 212, the processor 43 may (1) use information from the memory 211 to update the configuration information in the EEROM 47, (2) execute a self-test procedure which tests various internal circuitry within the circuit 41 of the relay module 12, or (3) carry out both the configuration update and the self-test procedure.

The memory 211 also stores a count 216. Due to the fact that the memory 211 is an electrically erasable memory, the processor 43 can change the value of the count 216, for example by decrementing the count. The purpose of the count 216 is discussed later. The memory 211 also includes configuration data 217, which is the configuration information that is transferred from the dongle 201 to the EEROM 47 in order to initialize or update the configuration information in the EEROM 47.

Connection of the dongle 201 to the connector 26 of the relay module 12 is carried out while the relay module 12 is powered down. When power is subsequently applied to the relay module 12, the processor 43 is powered up and begins execution of an initialization portion of its program. As part of this initialization portion, the processor 43 checks to see whether the relay module 12 is coupled to a dongle 201 or to some other configuration of modules (such as that shown in FIG. 1). If the processor 43 determines that it is coupled to a dongle 201, then the processor 43 begins interacting with the dongle 201, which causes the driver circuit 207 to flash the LED 206 in a manner causing the LED 206 to appear as if it is on.

The processor 43 first inputs and checks the identifier pattern 212, in order to make sure that the memory 211 in the dongle 201 contains valid information. If the identifier pattern 212 does not conform to one of several predetermined identifier patterns, the processor 212 enters an endless loop or wait state, in which it is effectively doing nothing. This terminates activity on the bus 203, which in turn causes the LED 206 to be turned off. Alternatively, if the identifier pattern 212 is valid, then the processor uses it to determine what the processor should do.

In particular, a first identifier pattern indicates that the processor 212 should update the configuration information in the EEROM memory 47. If this pattern is detected, then before actually doing the update, the processor checks the count 216 to see if it is greater than zero. If the count 216 is zero, it means that the dongle is not permitted to be used for any further updates, and so the processor 43 enters an endless loop or wait state without doing the update, causing the LED 206 to be turned off. On the other hand, if the count 216 is found to be greater than zero, the processor 43 reads in the configuration data 217 from the dongle 201, and stores this configuration information in its EEROM 47, in place of any configuration information which may have already been in the EEROM 47. Next, the processor 43 decrements the count 216 in the dongle 201, and then the processor enters an endless loop or wait state, so the LED 206 turns off. An operator can then turn off power to the relay module 12, and disconnect the dongle 201 from the relay module 12.

The count 216 thus permits the dongle 201 to be programmed so that it can be used to update the master relay module 12 in each of a specified number of systems, after which the dongle 201 cannot be used to update any additional systems unless it is reinitialized. This permits a manufacturer to prepare configuration data 217 requested by a dealer or customer, and sell the dealer or customer the right to update a specified number of systems, by initializing the count 216 to equal the number of systems. As each system is updated by the dealer or customer, the count 216 is decremented, until it reaches zero. When the count 216 reaches zero, the dongle 201 cannot be used to update configuration information in any other relay module, unless and until it is reprogrammed by the manufacturer.

In the disclosed embodiment, the program executed by the processor 43 is stored in the ROM 48, which is not an erasable or reprogrammable part. However, the ROM 48 could alternatively be an electrically erasable read only memory, and when power is first turned on the processor 43 could copy the program from the ROM 48 to the RAM 46, and then execute the program from the RAM 46, partly for speed. In such a configuration, the dongle 201 could be used not only to update the configuration information in the EEROM 47, but could also be used to optionally update the program in the ROM 48.

In a second scenario, when the processor 43 initially checks the identifier pattern 212, the processor 43 may find that the identifier pattern 212 is indicating that the processor 43 should carry out the self-test procedure. The self-test program procedure is a portion of the operational program for the processor 43, which is always stored in the ROM 48. The processor 43 will then execute this self-test portion of its program. When the self-test procedure is completed, the processor 43 will enter a wait state or endless loop, causing the LED 206 to be turned off in order to indicate to the operator that the dongle 201 can be disconnected. The operator will then turn off power, and disconnect the dongle 201.

A third scenario is that, when the processor 43 checks the identifier pattern 212, it will find that the identifier pattern 212 is telling the processor to both (1) use the configuration data 217 to update the configuration information in EEROM 47, as discussed above, and (2) thereafter carry out the self-test procedure described above. The processor 43 will then do these two functions in sequence (unless of course the count 216 is found to be zero), and will thereafter enter a wait state or endless loop that causes the LED 206 to be turned off.

Figure 3:
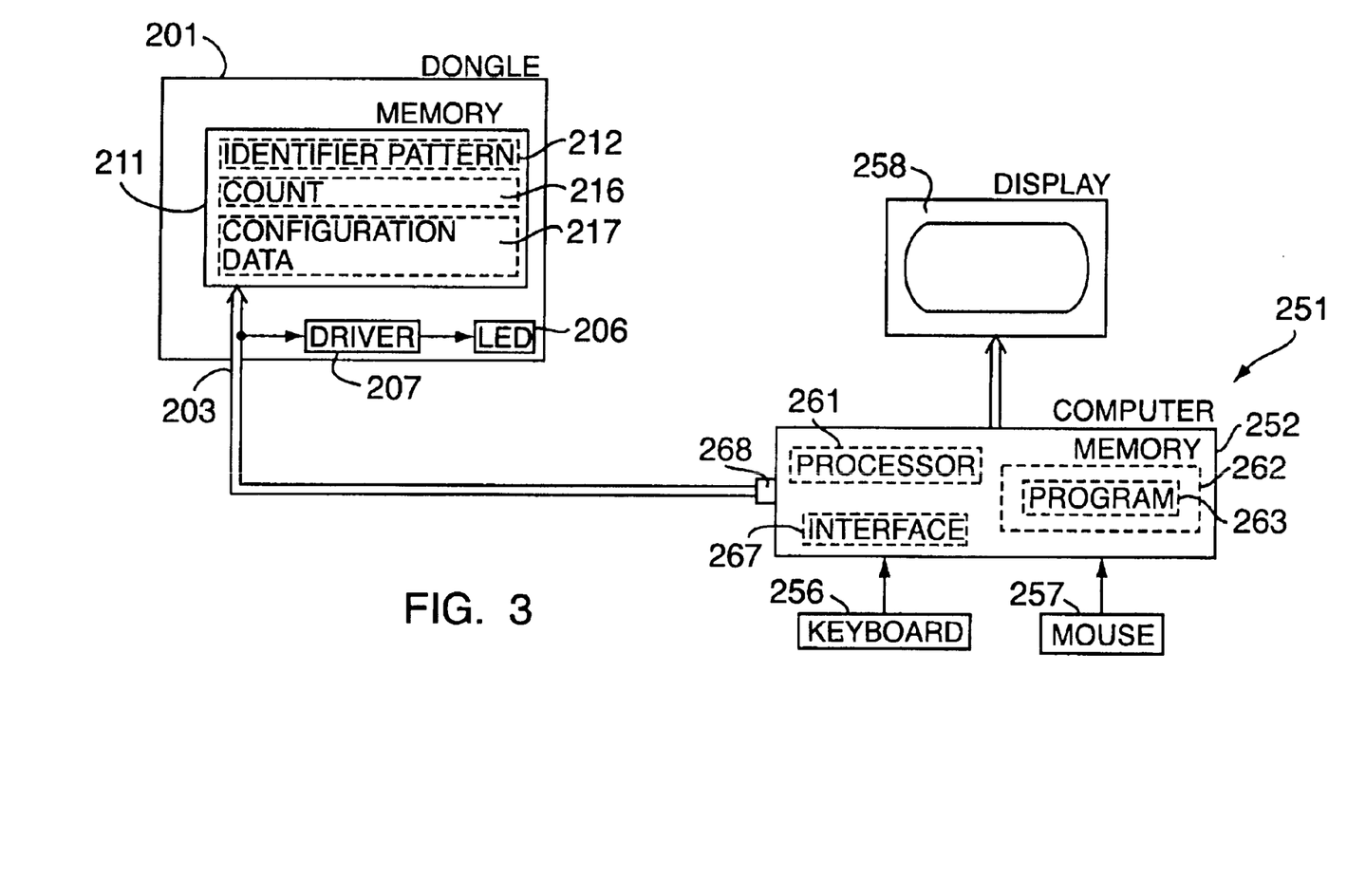
FIG. 3 is a block diagram of the dongle of FIG. 2 coupled to a typical computer system for programming the dongle in accordance with the present invention.

The technique used to program the memory 211 in the dongle 201 will now be described with reference to FIG. 3. More specifically, FIG. 3 shows the dongle 201, and a computer system 251. The computer system 251 in the disclosed embodiment is a known type of system commonly referred to in the industry as a personal computer or workstation. The computer system 251 includes a computer or system unit 252, which is coupled to a keyboard 256, a pointing device such as a mouse 257, and a cathode ray tube (CRT) display 258. The system unit 252 includes a processor 261, and a memory 262 containing a program 263 which is executed by the processor 261. In FIG. 3, the memory 262 is a diagrammatic representation of several different types of memory in the system unit 252, such as a hard disk drive and a random access memory. The system unit 252 also includes a dongle interface circuit 267, which may be in the form of a plug-in card inserted into an Industry Standard Architecture (ISA) slot, or a Peripheral Component Interconnect (PCI) slot. The interface 267 is coupled by a connector 268 to the cable of the dongle 201.

The processor 261 executes the program 263, which permits an operator of the computer system 251 to specify configuration information. In this regard, the operator would specify configuration information such as the arrangement of button modules and relay modules which is to be used in a given system, as well as other configuration information such as which relays are to be controlled by which push buttons, the primary function to be associated with each push button, and any secondary function which is to be associated with any push button. The program 263 then transforms this configuration into an appropriate format, and stores it in the configuration data portion 217 of the memory 211 of the dongle 201. The program 263 also permits the operator to specify how many systems can be updated with the configuration data 217, and the program 263 stores this specified number of systems in the memory 211 as the count 216. The program 263 also asks the operator to specify whether the dongle 201 is to cause a relay module to (1) update its configuration, (2) carry out the self-test procedure, or (3) update its configuration and also carry out the self-test. The program 263 then selects a predetermined identifier pattern which corresponds to the particular option selected by the operator, and stores this in the memory 211 as the identifier pattern 212. When the dongle 201 has been fully programmed by the computer system 251, the dongle 201 is disconnected from the computer system 251. It can thereafter be used to update and/or test the master relay module in the manner described above in association with FIG. 2.

TABLE 1

MOMENTARY
(Primary; 1 TO 64 Relays)

| BUTTON ACTION | RELAY STATE | LED STATE |
|---|---|---|
| RELEASE | OFF | OFF |
| PRESS | ON | ON |
| RELEASE | OFF | OFF |

TABLE 2

TOGGLE
(Primary; 1 TO 64 Relays)

| BUTTON PRESS | RELAY STATE | LED STATE |
|---|---|---|
| 0 | OFF | OFF |
| 1 | ON | ON |
| 2 | OFF | OFF |

TABLE 3

TOGGLE WITH BACKLIGHT
(Primary; 0 TO 64 Relays)

| BUTTON PRESS | RELAY STATE | BACKLIGHT STATE | LED STATE |
|---|---|---|---|
| 0 | OFF | OFF | OFF |
| 1 | ON | ON | ON |
| 2 | OFF | OFF | OFF |

TABLE 4

EXCLUSIVE SCROLL
(Primary; 2 Relays)

| BUTTON PRESS | RELAY A STATE | RELAY B STATE | LED STATE |
|---|---|---|---|
| 0 | OFF | OFF | OFF |
| 1 | ON | OFF | ON |
| 2 | OFF | ON | ON |
| 3 | OFF | OFF | OFF |

TABLE 5

EXCLUSIVE SCROLL
(Primary; 3 Relays)

| BUTTON PRESS | RELAY A STATE | RELAY B STATE | RELAY C STATE | LED STATE |
|---|---|---|---|---|
| 0 | OFF | OFF | OFF | OFF |
| 1 | ON | OFF | OFF | ON |
| 2 | OFF | ON | OFF | ON |
| 3 | OFF | OFF | ON | ON |
| 4 | OFF | OFF | OFF | OFF |

TABLE 6

EXCLUSIVE SCROLL
(Primary; 4 Relays)

| BUTTON PRESS | RELAY A STATE | RELAY B STATE | RELAY C STATE | RELAY D STATE | LED STATE |
|---|---|---|---|---|---|
| 0 | OFF | OFF | OFF | OFF | OFF |
| 1 | ON | OFF | OFF | OFF | ON |
| 2 | OFF | ON | OFF | OFF | ON |
| 3 | OFF | OFF | ON | OFF | ON |
| 4 | OFF | OFF | OFF | ON | ON |
| 5 | OFF | OFF | OFF | OFF | OFF |

TABLE 7

INCLUSIVE SCROLL
(Primary; 2 Relays)

| BUTTON PRESS | RELAY A STATE | RELAY B STATE | LED STATE |
|---|---|---|---|
| 0 | OFF | OFF | OFF |
| 1 | ON | OFF | ON |
| 2 | ON | ON | ON |
| 3 | OFF | OFF | OFF |

TABLE 8

INCLUSIVE SCROLL
(Primary; 3 Relays)

| BUTTON PRESS | RELAY A STATE | RELAY B STATE | RELAY C STATE | LED STATE |
|---|---|---|---|---|
| 0 | OFF | OFF | OFF | OFF |
| 1 | ON | OFF | OFF | ON |
| 2 | ON | ON | OFF | ON |
| 3 | ON | ON | ON | ON |
| 4 | OFF | OFF | OFF | OFF |

TABLE 9

INCLUSIVE SCROLL
(Primary; 4 Relays)

| BUTTON PRESS | RELAY A STATE | RELAY B STATE | RELAY C STATE | RELAY D STATE | LED STATE |
|---|---|---|---|---|---|
| 0 | OFF | OFF | OFF | OFF | OFF |
| 1 | ON | OFF | OFF | OFF | ON |
| 2 | ON | ON | OFF | OFF | ON |
| 3 | ON | ON | ON | OFF | ON |
| 4 | ON | ON | ON | ON | ON |
| 5 | OFF | OFF | OFF | OFF | OFF |

TABLE 10

BINARY SCROLL
(Primary; 2 Relays)

| BUTTON PRESS | RELAY A STATE | RELAY B STATE | LED STATE |
|---|---|---|---|
| 0 | OFF | OFF | OFF |
| 1 | ON | OFF | ON |
| 2 | OFF | ON | ON |
| 3 | ON | ON | ON |
| 4 | OFF | OFF | OFF |

TABLE 11

BINARY SCROLL
(Primary; 3 Relays)

| BUTTON PRESS | RELAY A STATE | RELAY B STATE | RELAY C STATE | LED STATE |
|---|---|---|---|---|
| 0 | OFF | OFF | OFF | OFF |
| 1 | ON | OFF | OFF | ON |
| 2 | OFF | ON | OFF | ON |
| 3 | ON | ON | OFF | ON |
| 4 | OFF | OFF | ON | ON |
| 5 | ON | OFF | ON | ON |
| 6 | OFF | ON | ON | ON |
| 7 | ON | ON | ON | ON |
| 8 | OFF | OFF | OFF | OFF |

TABLE 12

BINARY SCROLL
(Primary; 4 Relays)

| BUTTON PRESS | RELAY A STATE | RELAY B STATE | RELAY C STATE | RELAY D STATE | LED STATE |
|---|---|---|---|---|---|
| 0 | OFF | OFF | OFF | OFF | OFF |
| 1 | ON | OFF | OFF | OFF | ON |
| 2 | OFF | ON | OFF | OFF | ON |
| 3 | ON | ON | OFF | OFF | ON |
| 4 | OFF | OFF | ON | OFF | ON |
| 5 | ON | OFF | ON | OFF | ON |
| 6 | OFF | ON | ON | OFF | ON |
| 7 | ON | ON | ON | OFF | ON |
| 8 | OFF | OFF | OFF | ON | ON |
| 9 | ON | OFF | OFF | ON | ON |
| 10 | OFF | ON | OFF | ON | ON |
| 11 | ON | ON | OFF | ON | ON |
| 12 | OFF | OFF | ON | ON | ON |
| 13 | ON | OFF | ON | ON | ON |
| 14 | OFF | ON | ON | ON | ON |
| 15 | ON | ON | ON | ON | ON |
| 16 | OFF | OFF | OFF | OFF | OFF |

TABLE 13

TIMER
(Secondary; 1 TO 64 Relays)

| BUTTON PRESS | RELAY STATE | LED STATE |
|---|---|---|
| 0 | OFF | OFF |
| 1 | ON | ON |
| 2 | OFF | OFF |
| 0 | — | — |
| HOLD 3 SEC | ON X SEC/THEN OFF | FLASH X SEC/THEN OFF |

TABLE 14

INTERMITTENT
(Primary; 1 TO 64 Relays)

| BUTTON PRESS | RELAY STATE | LED STATE |
|---|---|---|
| 0 | OFF | OFF |
| 1 | REPEAT Y SEC CYCLE: ON Z SEC/OFF Y-Z SEC | REPEAT Y SEC CYCLE: ON Z SEC/FLASH Y-Z SEC |
| 2 | OFF | OFF |

TABLE 15

INTERMITTENT
(Secondary; 1 TO 64 Relays)

| BUTTON PRESS | RELAY STATE | LED STATE |
|---|---|---|
| 0 | OFF | OFF |
| 1 | ON | ON |
| 2 | OFF | OFF |
| 0 | — | — |
| HOLD 3 SEC NEXT | REPEAT Y SEC CYCLE: ON Z SEC/OFF Y–Z SEC OFF | REPEAT Y SEC CYCLE: ON Z SEC/FLASH Y–Z SEC OFF |

TABLE 16

INTERMITTENT PERIOD INCREMENT
(Primary; 0 Relays)

| BUTTON PRESS | ACTION | LED STATE |
|---|---|---|
| PRESS | INCREMENT Y | ON |
| RELEASE | NONE | OFF |

TABLE 17

INTERMITTENT PERIOD DECREMENT
(Primary; 0 Relays)

| BUTTON PRESS | ACTION | LED STATE |
|---|---|---|
| PRESS | DECREMENT Y | ON |
| RELEASE | NONE | OFF |

We claim:

1. A control system for electrical devices in a vehicle and comprising:

at least one solid state output/relay module with processing and memory capability, said output relay module being programmable to store configuration data corresponding to predetermined states for the various devices to be controlled, and said memory capability including a non-volatile component (EEROM), at least one solid state input module with processing capability, said input module having selector switches for preselecting a variety of device states, and said input module further providing a visual indication of the states for these devices, a data bus to provide communication between said input and output modules, at least one dongle removably coupleable to said relay module, said dongle including a memory accessible by an internal identification pattern for storing configuration data, said dongle being capable when connected to said relay module of altering the configuration data stored in said non-volatile of said output/relay module.

2. The control system according to claim 1 further characterized by a computer selectively connected to with said dongle to vary the configuration data stored in the dongle memory, said computer including a program capable of communicating with said dongle memory via an identification procedure so that the dongle can only be so reprogrammed by on authorized computer capable of conducting a proper identification of the dongle's identification pattern.

3. A control system for electrical devices in a vehicle comprising:

a power supply;

at least one relay module comprising a microprocessor, computer memory and at least one output for controlling said electrical devices, said relay module being programmable to store configuration data corresponding to predetermined states for the electrical devices to be controlled, said memory comprising non-volatile memory (EEROM);

at least one input module comprising a microprocessor, said input module having a plurality of variable function switches for selecting predetermined states for said devices;

a data bus for providing communication between said relay module and said input module; and a jumper for configuring said relay module.

4. A control system for electrical devices as defined in claim 3 further comprising a programmable dongle connectable to said relay module for configuring said non-volatile memory.

5. A control system for electrical devices as defined in claim 3 comprising a first relay module functioning as a master relay and a plurality of relay modules connected to said master configured as slave modules thereto.

6. A control system for electrical devices as defined in claim 3 wherein said input module further comprises visual indicators for identifying selected states for said devices.

7. A control system for electrical devices as defined in claim 3 wherein said jumper is a DIP switch.

8. A control system for electrical devices as defined in claim 3 wherein said variable function switches are selectively configured to implement a primary function, a secondary function, either a primary or a secondary function, or both primary and secondary functions for control of said relay modules or said electrical devices.

9. A control system for electrical devices as defined in claim 3 wherein said variable function switches further comprise visual indicators for identifying the functional configuration of said switches.

10. A control system for electrical devices as defined in claim 3 wherein said variable function switches comprise visual indicators for identifying the current state of said electrical devices.

11. A control system for electrical devices as defined in claim 3 wherein said variable function switches control one or more said relay modules or electrical devices.

12. A control system for electrical devices as defined in claim 3 further comprising at least one said variable function switch configured in an inclusive scroll mode such that repeated operation of said switch inclusively activates each of an ordered set of said relay modules or electrical devices.

13. A control system for electrical devices as defined in claim 3 further comprising at least one said variable function switch configured in an exclusive scroll mode such that repeated operation of said switch exclusively activates each of an ordered set of said relay modules or electrical devices.

14. A control system for electrical devices as defined in claim 3 further comprising at least one said variable function switch configured in a binary scroll mode such that repeated operation of said switch activates each of an ordered set of said relay modules or electrical devices corresponding to bit values of a binary number incremented by repeated operation of said switch.

15. A control system for electrical devices as defined in claim 3 further comprising at least one said variable function switch configured in a timer mode such that operation of said switch activates each of a predetermined set of said relay modules or electrical devices for a predetermined interval of time.

16. A control system for electrical devices as defined in claim 3 further comprising at least one said variable function switch configured in a intermittent mode such that operation of said switch cyclically activates and inactivates each of a predetermined set of said relay modules or electrical devices for first and second predetermined intervals of time respectively.

17. A control system for electrical devices as defined in claim 16 further comprising at least one said variable function switch configured in a intermittent period increment mode such that for each repeated operation of said switch said first and/or second intervals of time are incremented by a predetermined period of time.

18. A control system for electrical devices as defined in claim 16 further comprising at least one said variable function switch configured in a intermittent period decrement mode such that for each repeated operation of said switch said first and/or second intervals of time are decremented by a predetermined period of time.

19. A control system for electrical devices as defined in claim 3 further comprising at least one said variable function switch configured in a clone mode such that operation of said variable function switch implements the functions of another of said variable function switches.

20. A control system for electrical devices as defined in claim 3 further comprising a clock for synchronizing transmission of serial data via said data bus.

* * * * *